United States Patent [19]

Kaminaka et al.

[11] Patent Number: 4,490,760

[45] Date of Patent: Dec. 25, 1984

[54] THIN-FILM MAGNETIC HEAD

[75] Inventors: Nobuyuki Kaminaka; Kenji Kanai, both of Neyagawa; Noboru Nomura, Kyoto, all of Japan

[73] Assignee: Matsushita Electric Industrial Co., Ltd., Osaka, Japan

[21] Appl. No.: 340,367

[22] Filed: Jan. 18, 1982

[30] Foreign Application Priority Data

Jan. 23, 1981 [JP] Japan .................................. 56-9287

[51] Int. Cl.³ .......................... G11B 5/16; G11B 5/25; G11B 5/20
[52] U.S. Cl. .................................. 360/126; 360/119; 360/123
[58] Field of Search .............. 360/126, 119, 122, 123, 360/124, 125, 127

[56] References Cited

U.S. PATENT DOCUMENTS

| | | | |
|---|---|---|---|
| 3,639,699 | 2/1972 | Tiemann | 360/126 |
| 3,662,119 | 5/1972 | Romankiw | 360/126 |
| 4,092,688 | 5/1978 | Nomura | 360/123 |
| 4,353,102 | 10/1982 | Kanai | 360/119 |
| 4,386,383 | 5/1983 | Desserre | 360/126 |
| 4,404,609 | 9/1983 | Jones | 360/126 |

Primary Examiner—Robert Martin Kilgore
Attorney, Agent, or Firm—Stevens, Davis, Miller & Mosher

[57] ABSTRACT

A thin-film magnetic head having a magnetic substrate made from ferrite, iron-aluminum-silicon alloy or like material, and an upper magnetic layer formed on the magnetic substrate with a lower magnetic layer and a conductive layer interposed therebetween. A portion of the upper magnetic layer is jointed to the magnetic substrate while another portion of the upper magnetic layer is jointed to the lower magnetic layer through a non-magnetic layer of $SiO_2$ or like material constituting a magnetic gap. The lower magnetic layer, magnetic substrate, upper magnetic layer and the non-magnetic layer in combination form a closed magnetic circuit. A groove is defined between the lower magnetic layer and the magnetic substrate, and formed in the side surface of the magnetic substrate adapted to face a magnetic recording medium. The recess is filled with a non-magnetic material such as glass. Accordingly, it is possible to realize a definite pole piece length to permit an improvement in short-wavelength reproduction characteristics.

7 Claims, 4 Drawing Figures

THIN-FILM MAGNETIC HEAD

BACKGROUND OF THE INVENTION

The present invention relates to a thin-film magnetic head and, more particularly, to a thin-film magnetic head having improved magnetic efficiency and short-wavelength reproduction characteristics, as well as a simplified production process for making it.

DESCRIPTION OF THE PRIOR ART

Figure 1:
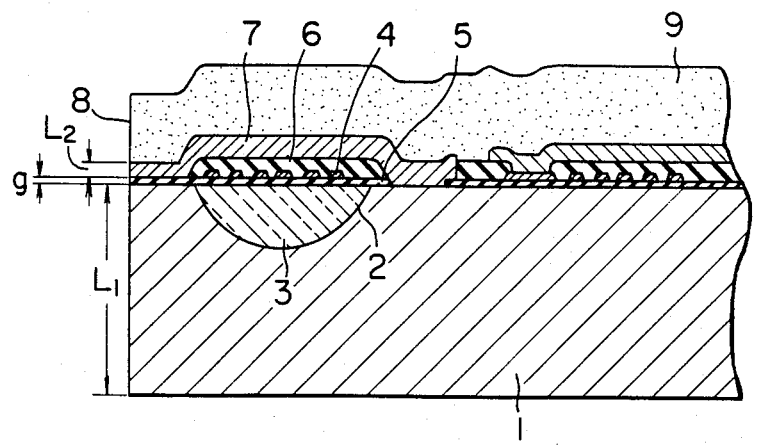
FIG. 1 is a sectional view of a conventional thin-film magnetic head.

FIG. 1 shows a typical conventional thin-film magnetic head including a magnetic substrate 1 having a groove portion 2 formed therein. The groove portion 2 is charged with a non-magnetic insulating material 3 such as glass, the surface of which is flattened by, for example, polishing so as to be flush with the surface of the magnetic substrate 1. Overlaying the non-magnetic insulating material 3, a conductive layer 4 constituting a coil portion together with non-magnetic insulating layers 5 and 6 which are intended for limiting the gap length (g) and to provide insulation between adjacent layers, are formed. An upper magnetic layer 7, applied on the insulating layer 6, is overlaid by a protecting layer 9 made of, for example, $SiO_2$. In use, this magnetic head is made abut or approach, at its side surface 8, a magnetic recording medium. The magnetic substrate 1 constituting the lower magnetic member usually has a thickness of greater than 0.5 mm, so that the length $L_1$ of the pole piece is considerably large. On the other hand, the upper magnetic layer 7 serving as the upper magnetic member has a small thickness of an order of several $\mu m$, so that the length $L_2$ of the magnetic piece presented by the upper magnetic layer 7 is considerably small. Namely, when compared with the pole piece length $L_2$, the pole piece length $L_1$ can be regarded as being of semi-infinite pole piece length.

In this arrangement having a pole piece of semi-infinite length, a certain disadvantage is experienced in some cases as compared with the magnetic head having definite pole piece length, in connection with the reproduction of short-wavelength signals recorded on the medium.

Figure 2:
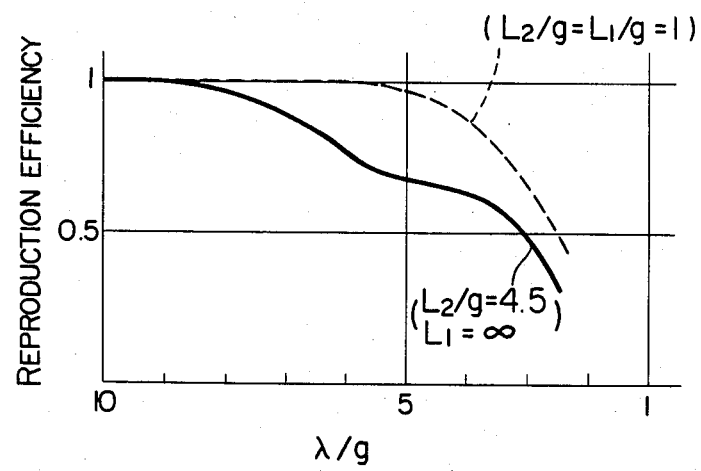
FIG. 2 is a diagram showing the relationship between the length of an end pole piece and the reproduction efficiency.

FIG. 2 shows the relationship obtained through a calculation between a factor $\lambda/g$ and the reproduction efficiency normalized by the reproduction efficiency at $\lambda/g = 10$, were $\lambda$ is wave length on the medium. In this case, it is assumed that the spacing S between the magnetic recording medium and the magnetic head is selected to meet the condition of $S/g = 0.3$. From FIG. 2, it will be seen that superior short-wavelength characteristics are obtained if the end pole piece length can be suitably selected to provide a definite pole piece length because, in such a case, it is possible to make an efficient use of the shape effect, as compared with the case where the pole piece length is semiinfinite.

This naturaly gives rise to demand for magnetic head which permits free selection of the end pole piece length and which has a high magnetic efficiency.

Unfortunately, however, no magnetic head meeting this demand with a simple construction has been proposed.

SUMMARY OF THE INVENTION

Accordingly, an object of the invention is to provide a thin-film magnetic head which is improved to present a high magnetic efficiency and superior short-wavelength reproduction characteristics with a simple construction.

The above and other objects, features and advantages of the invention will become clear from the following description of the preferred embodiment taken in conjunction with the accompanying drawings.

DESCRIPTION OF THE PREFERRED EMBODIMENT

Figure 3:
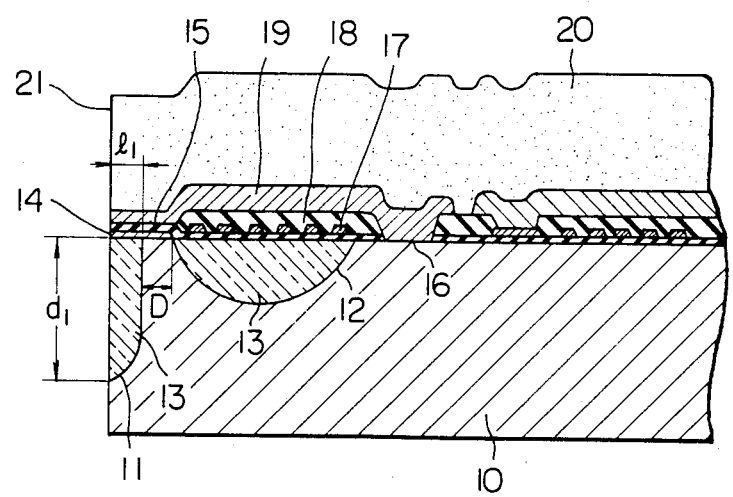
FIG. 3 is a sectional view of a thin-film magnetic head constructed in accordance with an embodiment of the invention.
Figure 4:
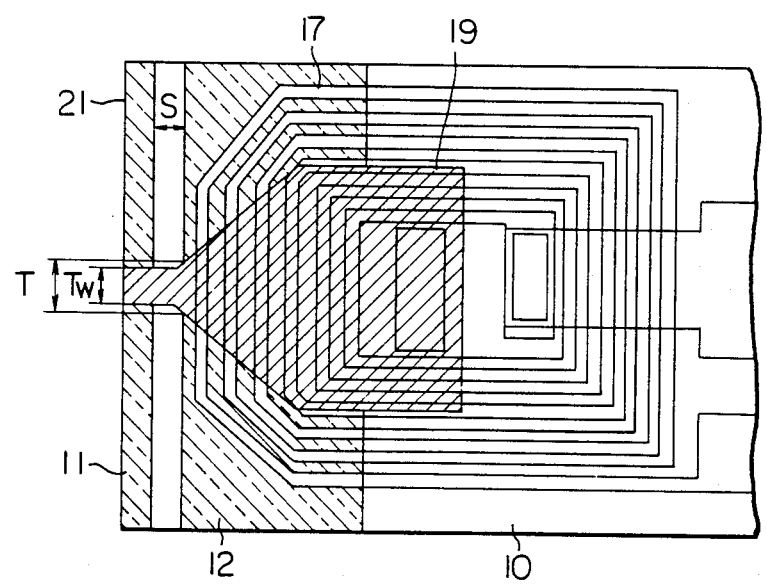
FIG. 4 is a plan view of the magnetic head as shown in FIG. 3.

FIG. 3 is a sectional view of a thin-film magnetic head in accordance with an embodiment of the invention, while FIG. 4 is a plan view of the magnetic head as shown in FIG. 3.

The magnetic head of this embodiment has a magnetic substrate 10 made of a magnetic material such as ferrite, iron-aluminum-silicon alloy of the like. The magnetic substrate 10 is provided with first and second grooves 11 and 12 which are filled with a non-magnetic insulating material 13 such as glass. The surface of material 13 is flattened by, for example, polishing. A distance D is preserved between the first groove 11 and the second groove 12. Then, a lower magnetic layer 14 which constitutes the lower end pole piece is formed to overlay the first groove 11 and the portion of the magnetic substrate 10 presenting the region of the distance D. No substantial problem is caused in the magnetic circuit even if the lower magnetic layer 14 slightly projects into the region of the second groove 12. Then, a non-magnetic insulating layer 15 made of $SiO_2$ or the like, constituting a gap member, is formed and the portion of the non-magnetic insulating layer 15 adjacent to a back gap 16 is selectively etched by a known method. Thereafter, a conductive layer 17 constituting a coil portion is formed in a spiral shape on the non-magnetic insulating layer 15. As will be clearly seen from FIG. 3, a half part of the coil portion constituted by the conductive layer 17, near to the first groove 11, runs above the second groove 12. No substantial problem is caused even if a part of the conductive layer 17 overlays the lower magnetic layer 14. Then, another non-magnetic insulating layer 18 formed from an inorganic material such as $SiO$, $SiO_2$ or the like or from an organic material such as photoresist material, is provided over the conductive layer 17.

Subsequently, an upper magnetic layer 19 constituting the upper pole piece is laid on the non-magnetic insulating layer 18, and a protecting layer 20 such as of $SiO_2$ is formed on the upper magnetic layer 19 thus completing the production of the magnetic head.

The magnetic head of the embodiment described above is provided with a single conductive layer having 6 turns of coil. However, the number of the conductive layers and the number of turns of the coil in the illustrated embodiment are not exclusive. Namely, the magnetic head of the invention can have two or more conductive layers, as well as other numbers of turns of the coil than 6.

In the magnetic head of the embodiment heretofore described in connection with FIG. 3, only two non-magnetic insulating layers 15 and 18 are used. This number of non-magnetic insulating layers, however, is not exclusive. Namely, according to the invention, the magnetic head can have additional non-magnetic insulating layer or layers as necessitated by the production process. If the occasion demands, the protecting layer 20 may be covered by a protecting plate or like member.

Thus, the characteristic feature of the invention resides in the fact that two grooves 11, 12 are formed in the magnetic substrate to permit free selection of the end pole piece length.

The side surface of the magnetic head thus formed and adapted to face the recording medium is polished and is finally shaped as desired.

Under this circumstance, the depth $d_1$ of the first groove 11 should be determined in relation to the wavelength $\lambda$ of the signal recorded on the recording medium. Namely, from the view point of processing, the depth $d_1$ will is preferably made as small as possible. However, if the depth $d_1$ is smaller than the maximum wavelength $\lambda_{max}$, the depth $d_1$ function as a false gap so that a signal having a certain deviation of phase from the actual signal phase will be detected at the gap $d_1$. Thus, the quality of the reproduced signal is deteriorated, unfavorably. Therefore, from the view point of the gap loss, the depth $d_1$ is preferably selected to meet the condition of $d_1/\lambda_{max} \geq 1$.

The length $l_1$ of the first groove 11 as measured from the side surface 21 facing the recording medium determines whether the length of the lower end pole piece of the lower magnetic layer 14 is substantially infinite or not. Namely, the length $l_1$ is determined in relation to the maximum wavelength $\lambda_{max}$ of the signal to be reproduced.

In general, the spacing loss is given by $$-54.6 \frac{l_1}{\lambda_{max}} \text{ (dB)}.$$

Setting a standard of the attenuation of signal at a level of, for example, $-27$ dB, the ratio $l_1/\lambda_{max}$ is preferably selected to be greater than 0.5. Since a too large length $l_1$ makes the gap depth of the magnetic head excessively large, there is a practical limit in increasing the length $l_1$. The distance D between the grooves 11 and 12 is determined from the view point of processing ease, as well as magnetic characteristics of the magnetic substrate 10 in the region of the distance D. Namely, a too small distance D makes the processing difficult and tends to cause a magnetic transformation, resulting in a lowered efficiency of the magnetic circuit. On the other hand, a too large distance D undesirably increases the gap depth. A series of experiments conducted by the present inventors showed that a favorable effect is obtained when the depth D is selected to fall between 5 and 20 $\mu$m. The second groove 12 serves to preserve a large distance between the upper magnetic layer 19 and the magnetic substrate 10. This in turn provides a higher magnetic efficiency of the magnetic head even with a comparatively small difference in step level.

As will be seen from FIG. 4, the width of the track is limited by the width Tw of the upper magnetic layer 19. The length of the magnetic substrate 10 in the widthwise direction of the track is considerably greater than the width Tw of the upper magnetic layer. However, if it is necessary to reduce the cross-talk from tracks in close proximity, the first groove 11 and the second groove 12 are connected to each other in the region of the distance D while leaving or removing the magnetic substrate 10 and the lower magnetic layer 14 over a length T in the widthwise direction of the track in the region of the distance D. In other words, the magnetic substrate 10 and the lower magnetic layer 14 are partially removed in the region of the distance D leaving a portion of length T in the direction of width of the track at which the first groove and the second groove are connected directly to each other through recesses which are also filled with a non-magnetic insulating material such as glass. In this case, the width W is selected to be greater, by several $\mu$m, than the width Tw of the upper magnetic layer 19, so that the track width is determined by the width Tw of the upper magnetic layer 19.

By forming the grooves in the magnetic substrate in the manner described, it is possible to realize a laminated structure of small difference in step level to permit a simplification of the production process. In addition, since the length of the end pole piece can be selected as desired, the design can be optimized in order to realize superior shortwavelength reproduction characteristics and high magnetic efficiency of the thin film magnetic head.

What is claimed is:

1. A thin-film magnetic head comprising: a magnetic substrate; a lower magnetic layer formed on said magnetic substrate; an upper magnetic layer formed on said lower magnetic layer with at least one conductive layer interposed therebetween, a part of said upper magnetic layer being jointed to said magnetic substrate while another part of said upper magnetic layer is jointed to said lower magnetic layer through a non-magnetic layer constituting a magnetic gap, so that a closed magnetic circuit is formed by said lower magnetic layer, said magnetic substrate, said upper magnetic layer and said non-magnetic layer; and a non-magnetic material filling in a groove which is defined between said lower magnetic layer and said magnetic substrate and which is formed in the side surface of said magnetic substrate which is adapted to face a magnetic recording medium.

2. A thin-film type magnetic head as claimed in claim 1, wherein a depth $d_1$ of said groove along said side surface of said magnetic substrate adapted to face said magnetic recording medium is selected in relation to a maximum wavelength $\lambda_{max}$ of a signal recorded on said magnetic recording medium in such a manner as to satisfy a condition of $d_1/\lambda_{max} \geq 1$.

3. A thin-film magnetic head as claimed in claim 1, wherein a length $l_1$ of said groove as measured from said side surface of said magnetic substrate adapted to face said magnetic recording medium is selected in relation to a maximum wavelength $\lambda_{max}$ of a signal recorded on said magnetic recording medium so as to satisfy a condition of $l_1/\lambda_{max} \geq 0.5$.

4. A thin-film magnetic head as claimed in claim 1, wherein said conductive layer between said lower magnetic layer and said upper magnetic layer comprises a coil portion, and said closed magnetic circuit constituted by said lower magnetic layer, said magnetic substrate, said upper magnetic layer and said non-magnetic layer intersects with said coil portion.

5. A thin-film magnetic head as claimed in claim 1, wherein said magnetic substrate is provided in one of the major surfaces thereof with a groove filled with a non-magnetic material and said lower magnetic layer is formed on said one of major surfaces of said substrate, said conductive layer between said lower magnetic layer and said upper magnetic layer comprising a coil portion intersecting with said closed magnetic circuit constituted by said lower magnetic layer, said magnetic substrate, said upper magnetic layer and said non-magnetic layer, a portion of said conductive layer comprising said coil portion, located near said side surface of said substrate adapted to face said recording medium rather than the portion jointed between said upper magnetic layer and said substrate, being positioned above said groove formed in said one of the major surfaces of said substrate.

6. A thin-film magnetic head as claimed in claim 1, wherein said magnetic substrate is made from ferrite or an iron-aluminum-silicon alloy, and wherein said groove formed in said side surface of said substrate adapted to face said recording medium is filled with glass.

7. A thin-film magnetic head as claimed in claim 1, wherein a width of a portion of said upper magnetic layer adjacent to said side surface of said substrate adapted to face said recording medium is substantially equal to a track width of said recording medium.

* * * * *